US012610881B2

(12) United States Patent
Polster

(10) Patent No.: US 12,610,881 B2
(45) Date of Patent: Apr. 28, 2026

(54) APPARATUS FOR CLEANING NARROW ROOT CROPS, A CORRESPONDING CLEANING APPARATUS, A HARVESTING AND CLEANING MACHINE AND A METHOD

(71) Applicant: Exel Industries, Epernay (FR)

(72) Inventor: Sebastian Polster, Schierling (DE)

(73) Assignee: Exel Industries, Epernay (FR)

( * ) Notice: Subject to any disclaimer, the term of this patent is extended or adjusted under 35 U.S.C. 154(b) by 979 days.

(21) Appl. No.: 17/627,687

(22) PCT Filed: Aug. 10, 2020

(86) PCT No.: PCT/EP2020/072374
§ 371 (c)(1),
(2) Date: Jan. 16, 2022

(87) PCT Pub. No.: WO2021/028381
PCT Pub. Date: Feb. 18, 2021

(65) Prior Publication Data
US 2022/0240443 A1 Aug. 4, 2022

(30) Foreign Application Priority Data

Aug. 13, 2019 (DE) ..................... 10 2019 121 768.7

(51) Int. Cl.
*A01D 33/08* (2006.01)
*A01D 17/06* (2006.01)
(Continued)

(52) U.S. Cl.
CPC ............. *A01D 33/08* (2013.01); *A01D 17/06* (2013.01); *A01D 17/10* (2013.01); *A01D 33/04* (2013.01); *A01D 2017/103* (2013.01)

(58) Field of Classification Search
CPC ........ A01D 33/08; A01D 33/04; A01D 17/06; A01D 17/10; A01D 2017/103
(Continued)

(56) References Cited

U.S. PATENT DOCUMENTS 318,254 A * 5/1885 Hoover .................. A01D 17/10
209/322
865,780 A * 9/1907 Hoover .................. A01D 17/10
171/13
(Continued)

FOREIGN PATENT DOCUMENTS

DE 102018127844 A1 * 5/2020 ............. A01D 17/10
EP 0264891 A2 4/1988
(Continued)

*Primary Examiner* — Christopher J Sebesta
*Assistant Examiner* — Joel F. Mitchell
(74) *Attorney, Agent, or Firm* — Soquel Group LLC

(57) ABSTRACT

Apparatus for cleaning narrow root crops including a roller device with two rotatable rollers forming a separating crop inlet, a separating track, a coarse material outlet, a fine material outlet, and a roller gap, and a conveyor downstream of the roller device. The separating track is formed by the top of the rollers and the fine material outlet is located below the roller gap. The coarse material outlet is at the end of the separating track opposite the separating material inlet. The roller gap is large enough to allow the narrow root crops to pass through to the fine crop outlet and small enough to retain coarse material that has a minimum dimension greater than the maximum root diameter, and transport it to the coarse material outlet. The conveyor is below the roller gap at the fine material outlet and receives all narrow root crops passing through the roller gap.

15 Claims, 2 Drawing Sheets

(51) Int. Cl.
  *A01D 17/10*           (2006.01)
  *A01D 33/04*           (2006.01)
(58) Field of Classification Search
  USPC ...................................................... 171/14, 58
  See application file for complete search history.

(56)                    References Cited

U.S. PATENT DOCUMENTS

|  |  |  |  |  |  |
|---|---|---|---|---|---|
| 866,932 | A | * | 9/1907 | Hoover | ................ A01D 45/006 |
|  |  |  |  |  | 171/135 |
| 965,667 | A | * | 7/1910 | Thompson | ............. A01D 17/10 |
|  |  |  |  |  | 171/138 |
| 980,953 | A | * | 1/1911 | Hoover | ................ A01D 45/006 |
|  |  |  |  |  | 171/123 |
| 1,083,927 | A | * | 1/1914 | Eversman et al. | ...... A01D 23/04 |
|  |  |  |  |  | 99/635 |
| 2,370,539 | A | * | 2/1945 | Hodecker | ............... B07B 13/00 |
|  |  |  |  |  | 209/924 |
| 2,626,708 | A | * | 1/1953 | Shuler | .................... A01D 33/08 |
|  |  |  |  |  | 209/257 |
| 3,267,502 | A |  | 8/1966 | Wells |  |
| 3,451,084 | A | * | 6/1969 | Silver | .................... A01D 33/08 |
|  |  |  |  |  | 15/3.17 |
| 3,656,488 | A | * | 4/1972 | Dumanowski et al. | ...................... |
|  |  |  |  |  | A01D 33/08 |
|  |  |  |  |  | 460/145 |
| 4,430,210 | A | * | 2/1984 | Tuuha | ....................... B07B 1/42 |
|  |  |  |  |  | 209/672 |
| 4,972,960 | A | * | 11/1990 | Bielagus | ................. D21D 5/02 |
|  |  |  |  |  | 209/672 |
| 5,012,933 | A | * | 5/1991 | Artiano | .................... B27N 3/14 |
|  |  |  |  |  | 209/673 |
| 5,069,292 | A |  | 12/1991 | Baker et al. |  |
| 6,237,778 | B1 | * | 5/2001 | Weston | .................. A01D 17/06 |
|  |  |  |  |  | 209/672 |
| 2019/0261553 | A1 | * | 8/2019 | Niehues et al. | ..... A01D 17/101 |

FOREIGN PATENT DOCUMENTS

| EP |  | 1310148 A2 | 5/2003 |
|---|---|---|---|
| EP |  | 2298057 A1 | 3/2011 |
| GB |  | 2145612 A | 4/1985 |
| WO |  | 9204816 A1 | 4/1992 |

\* cited by examiner

APPARATUS FOR CLEANING NARROW ROOT CROPS, A CORRESPONDING CLEANING APPARATUS, A HARVESTING AND CLEANING MACHINE AND A METHOD

CROSS-REFERENCE TO RELATED APPLICATIONS

This application claims benefit under 35 USC § 371 of PCT Application No. PCT/EP2020/072374 entitled UNIT FOR CLEANING NARROW ROOT CROPS, CORRESPONDING CLEAING APPARATUS, HARVESTING AND CLEANING MACHINE AND APPARATUS, filed on Aug. 10, 2020 by inventor Sebastion Polster. PCT Application No. PCT/EP2020/072374 claims priority of German Patent Application No. 10 2019 121 768.7, filed on Aug. 13, 2019.

FIELD OF THE INVENTION

The present invention relates to a device for cleaning narrow root crops.

BACKGROUND OF THE INVENTION

Narrow root crops are, for example: dandelion root, parsley root, chicory root (*Cichorium intybus* var. *foliosum*), parsnip root (*Pastinaca sativa*), carrot root or manioc root (*Manihot esculenta*).

In order to separate root crops from unwanted impurities, such as soil or stones, which are carried along during the harvesting or uprooting process, cleaning devices are known from the prior art.

From EP2298057 a roller cleaner in combination with a screen belt cleaner is known. The screen belt cleaner is movable in relation to the roller cleaner in order to adjust the length of the cleaning track to the crop's degree of contamination. This device is essentially intended for cleaning sugar beets.

From GB2145612 a separating device is known which separates soil and/or stones from potatoes. The separating device has two star rollers and a clod roller over which the material to be separated is guided. Soil and stones fall through the star rollers and potatoes are transported away above the rollers.

A cleaning device for root or tuber crops, such as potatoes, onions or kohlrabi, is known from U.S. Pat. No. 5,069,292. The cleaning device has rollers and two belt conveyors that form a meandering cleaning path through which the material to be separated is guided.

The known cleaning devices are not suitable for separating narrow root crops efficiently from soil and stones.

SUMMARY OF THE DESCRIPTION

The present invention aims to make the separation process for narrow root crops, as well as their harvesting process, more efficient.

In particular, the present invention has the task of remedying the disadvantages of the prior art.

To this end, it proposes a device for cleaning narrow root crops having the features of claim 1.

An advantage of this device is that the roller device allows thorough separation of the root crops from objects larger than the root crops without mistakenly discharging the root crops with these larger objects.

The first conveyor downstream allows clean separation of the root crops from objects smaller than the root crops.

The features of claim 2 allow even better separation of the coarse material.

The features of claims 3 and 4 allow a space-saving design of the device with a relatively long cleaning track and reliable discharge of the coarse material.

The features of claims 5 and 6 allow economical fabrication of the device and good separation of the root crops from the fine material.

The features of claims 7 and 8 define the root types for which the cleaning device achieves particularly good results.

The invention also involves a cleaning apparatus for cleaning narrow root crops according to claims 9 and 10. With this cleaning apparatus, the root crops can be precleaned and, if necessary, transported from a hopper or harvesting device to the device for cleaning, and efficiency can be increased.

The invention also involves a harvesting and cleaning machine according to claim 11. This allows the root crops to be cleaned efficiently directly after harvesting.

The invention also involves a method for cleaning narrow root crops according to claim 12.

BRIEF DESCRIPTION OF THE DRAWINGS

The invention is explained by means of the following example description, which refers to the accompanying drawings, of which.

DETAILED DESCRIPTION OF EMBODIMENTS

In the present description of the invention, indications of suitability, such as "adapted for this purpose", are used in such a way that the associated action is also disclosed. For example, the expression "trained to transport" includes the disclosure "transported".

Figure 1:
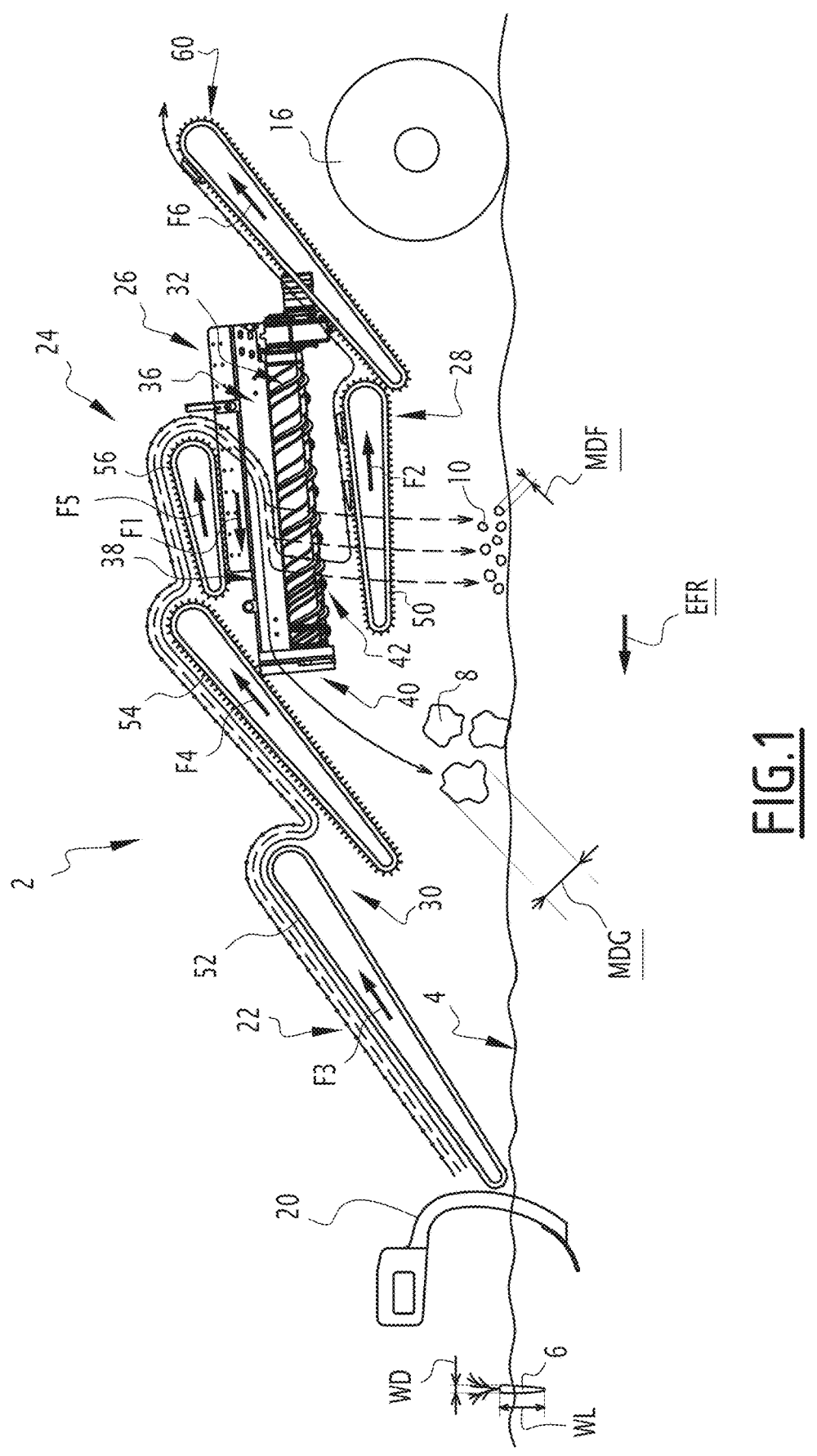
FIG. 1 is a schematic longitudinal view of a harvesting and cleaning machine according to the invention for harvesting and cleaning narrow root crops during the harvesting and cleaning process.

FIG. 1 schematically shows a harvesting and cleaning machine 2 according to the invention.

The harvesting and cleaning machine 2 is used to harvest narrow root crops 6 located in the soil 4.

The term "narrow root crops" in the context of the present invention means, in particular, root crops having a ratio of root length to maximum root diameter $WL/WD_{max}$ greater than 2, preferentially greater than 4, greater than 5; greater than 6, greater than 7, greater than 8 or greater than 9. The root length WL of is typically from 5 cm to 1 m and the maximum root diameter, i.e. the diameter at the thickest point, is from 5 mm to 5 cm.

Preferentially, the narrow root crops 6 are in the group: dandelion root, parsley root, chicory root (*Cichorium intybus* var. *foliosum*), parsnip root (*Pastinaca sativa*), carrot root, manioc root (*Manihot esculenta*).

Apart from the root crops 6, the soil 4 contains coarse material 8 and fine material 10. The coarse material 8 includes, for example, stones or clods of earth that have a relative size that is larger than the size of the root crops. In particular, the coarse material 8 has a minimum dimension MDG that is greater than the maximum root diameter $WD_{max}$.

The fine material 10 includes, for example, crumbs of earth, stones or sand that are much smaller than the root crops. In particular, the fine material 10 has a maximum dimension MDF that is smaller than the maximum root diameter $WD_{max}$.

The harvesting and cleaning machine 2 defines a harvesting direction of travel EFR, or generally "direction of travel", which on the figures runs from right to left and is generally directed toward the front of the harvesting and cleaning machine 2.

The harvesting and cleaning machine 2 has wheels 16 and a frame that is not shown. Moreover, the harvesting and cleaning machine 2 comprises a harvesting device 20 that is designed to convey the narrow root crops 6 and the soil comprising coarse material 8 and fine material 10 out of the ground and to deposit them as separated material 22. The separated material 22 can also comprise clumps of root crops 6 and adhering soil or stones that are the size of the coarse material 8.

The harvesting and cleaning machine 2 comprises a cleaning apparatus 24 for cleaning the narrow root crops. The cleaning apparatus 24 comprises a device 26 for cleaning narrow root crops, said device comprising a first conveyor 28.

The cleaning apparatus 24 further comprises a second conveyor 30 arranged between the harvesting device 20 and the device 26 and adapted to transport the separated material 22 from the harvesting device 20 to the device 26.

In FIG. 1, the separating material 22 is represented as the stream of narrow root crops 6 and is shown as a dotted-dashed line. The flow of coarse material 8 is shown as a solid line and the flow of fine material 10 is shown as a dashed line.

Figure 2:
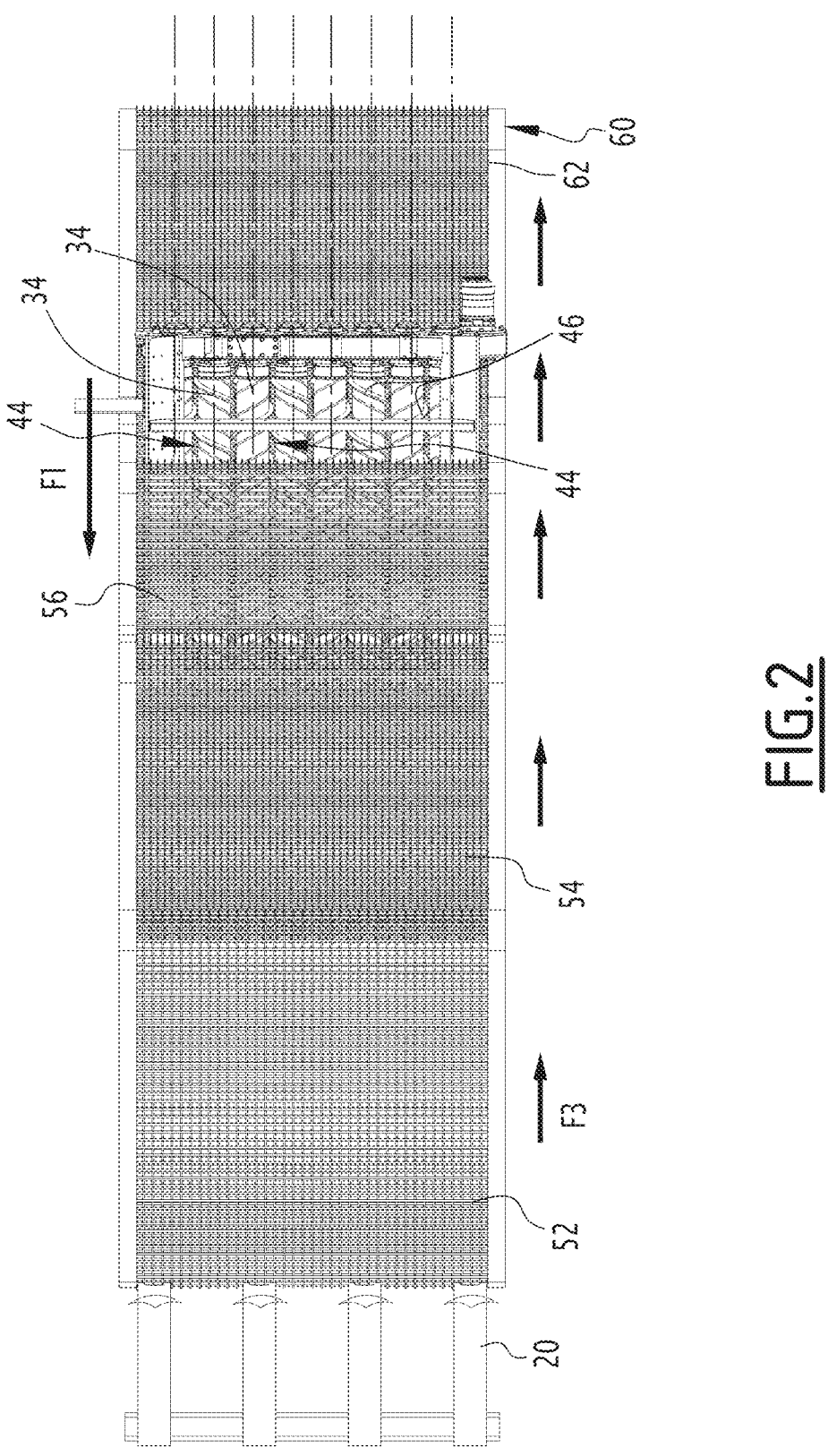
FIG. 2 is a schematic top view of the harvesting and cleaning machine in FIG. 1.

The device 26 for cleaning narrow root crops comprises a roller device 32 comprising at least two rotatable rollers 34 forming a separating material inlet 36, a separating track 38, a coarse material outlet 40, a fine material outlet 42 and a roller gap 44 (see FIG. 2). The conveying direction of the roller device 32 or the separating track 38 from the separating material inlet to the coarse material outlet, is marked F1.

The separating material inlet 36 is preferentially arranged behind the coarse material outlet 40 in the direction of travel EFR. Alternatively, the separating material inlet 36 is arranged at the same height as the coarse material outlet 40 in the direction of travel. The separating material inlet 36 can also or additionally be arranged to the side of the coarse material outlet 40 in a direction transverse to the direction of travel EFR. In the present case, the conveying direction F1 is forward in the direction of travel EFR. The conveying direction F1 can also be directed diagonally forward or sideways.

The separating track 38 is formed by an upper side of the rollers 34. The fine material outlet 42 is located below the roller gap 44 and the coarse material outlet 40 is located at the end of the separating track opposite the separating material inlet 36.

The roller gap 44 is large or wide enough to allow the narrow root crops 6 to pass through to the fine material outlet and small or narrow enough not to allow the coarse material 8, to pass through or be retained and transported to the coarse material outlet 40.

In the present case, the device 26 for cleaning narrow root crops has four pairs of rollers, each of which is formed by two rollers 34 which are driven in opposite directions so that the roller surfaces move through the roller gap from above. One roller 34 of a pair of rollers is rotatable around an axis A-A and the other roller 34 of a pair of rollers is rotatable around an axis B-B (FIG. 2). Axes A-A and B-B are essentially parallel. The narrow root crop cleaning device 26 may also have more or less than four pairs of rollers.

Each of the rotatable rollers 34 has on its surface a cleaning and transport spiral 46 designed to loosen impurities comprising the coarse material 8 from the root crops 6 and to transport the coarse material to the coarse material outlet. The cleaning and transport spirals 46 of the two rotatable rollers 34 of a pair of rollers are preferentially counter-rotating.

The separating track 38, the roller gap 44 and the rollers 34 are arranged and formed in such a way that clumps of root crops 6 and adhering soil or stones, these clumps being the size of the coarse material 8, are broken up by the rollers 34 and at least the root crops 6 are separated from the clumps and pass through the roller gap.

The first conveyor 28 is downstream of the roller device 32 and is arranged below the roller gap 44 at the fine material outlet 42. The first conveyor 28 is designed to pick up all the narrow root crops 6 that pass through the roller gap.

The first conveyor 28 has a conveying direction F2 opposite to the conveying direction F1 of the separating track 38.

Generally, the first conveyor 28 comprises a movable transport or sieve element, in particular an element with recesses, designed to separate fine material 10 having a maximum dimension smaller than the maximum root diameter of the root crops 6. The first conveyor can, for example, comprise a vibrating conveyor that has a vibrating plate as a transport or screening element. The first conveyor may also or additionally comprise a sieve shaker or vibrating sieve that has a cyclically reciprocating sieve plate.

In the present example, the first conveyor 28 comprises a belt conveyor having, as a transport or sieve element, a transport or sieve belt 50 which is, in particular, a belt with recesses designed to separate fine material 10 from the root crops 6. Preferentially, the transport or sieve belt 50 of the first conveyor comprises a "hedgehog belt". Such hedgehog belts are sold, for example, by the Artemis company under the name "hedgehog rod belt".

The first conveyor 28 may comprise any combination of one or more of the conveyors described above (e.g. belt conveyor and vibrating conveyor). These conveyors can be arranged consecutively. The first conveyor 28 may, for example, comprise a sieve belt or hedgehog belt and a sieve plate or vibrating plate.

The second conveyor 30 is designed to convey the material to be separated 22 to the separating material inlet 36.

The second conveyor 30 comprises at least one transport belt or a sieve belt, in particular a belt with recesses, which is designed to separate fine material 10 having a maximum dimension smaller than the maximum root diameter of the root crops 6. Advantageously, the second conveyor 30, or its transport or sieve belt, comprises a square rod belt or perforated rod belt 52 designed and arranged to receive the separation material 22 directly from the harvesting device 20. The square rod belt or perforated rod belt 52 is relatively insensitive to wear. Such square rod belts or perforated rod belts are sold, for example, by Artemis under the name "4-hole rod belt".

The second conveyor 30 further comprises at least one hedgehog belt, in the present case a first hedgehog belt 54 and a second hedgehog belt 56. The first hedgehog belt 54 is downstream of the square rod belt or perforated rod belt 52 and receives the separation material 22 from the square rod belt or perforated rod belt 52. The second hedgehog belt 56 is arranged completely above the separating track 38 and receives the separation material 22 from the first hedgehog belt 54 and feeds it to the separation material inlet 36.

Alternatively, one of the two hedgehog tapes 54, 56 or the square rod belt or perforated rod belt 52 can be omitted. The belts 52, 54, 56 may be structured or configured as a square rod belt, perforated rod belt, hedgehog belt or other belt depending on the configuration of the harvesting machine.

The square rod belt or perforated rod belt 52 has a conveying direction F3 that, in the present case, is directed backwards, or upward to the rear, in the direction of travel EFR. The first hedgehog belt 54 or the second hedgehog belt 56 has a conveying direction F4 or F5 that, in this case, is directed backwards in the direction of travel EFR, or upwards to the rear. The second hedgehog belt 54 allows the overall height of the device to be kept relatively small.

Generally, the harvesting device 20 is designed to convey the narrow root crops and soil from the ground and deposit them as separated material 22 onto the second conveyor 30.

The harvesting device 20 also has a third conveyor 60, which comprises a belt conveyor 62. The third conveyor 60 has a conveying direction F6 and is designed to receive the narrow root crops 6 from the first conveyor 28 and to convey them further, such as to a cleaning or washing device (not shown) and/or to a bunker in the vehicle.

Using the device involves one or more of the following steps:

First, the soil and the root crops 6 are lifted out of the ground by the harvesting device 20 and deposited as material to be separated 22 on the second conveyor 30. The separation material 22 is conveyed by the second conveyor 30 toward the narrow root crop cleaning device 26.

The material to be separated 22, which comprises narrow root crops and coarse material as well as very fine material, is fed to the separating material inlet 36 by the second conveyor 30.

The separation material 22 is guided over the separating track 38, whereby at least coarse material and the narrow root crops are separated from each other. Here, the narrow root crops 6 pass through the roller gap to the fine material outlet 42.

If the separation material 22 contains lumps of root crops 6 and adhering soil or stones, these lumps being the size of the coarse material 8, these lumps, in particular all the lumps, are broken up by the rollers 34 and the root crops 6 of the broken-up lumps pass through the roller gap 44. The fine material produced during the crushing process also passes through the roller gap 44. The remaining or leftover coarse material 8 is conveyed to the coarse material outlet.

The coarse material 8 separated from the root crops is discharged from the coarse material outlet 40.

The narrow root crops 6 or the fine material comprising the fine material are conveyed from the fine material outlet to the first conveyor 28, in the present case by gravity. The first conveyor 28 separates the narrow root crops 6 from the fine material and then feeds them to the third conveyor 60.

The device 26 is compact in design and has a high relative separation efficiency of the narrow roots from soil, clods of soil and stones, in particular a higher relative separation efficiency than a comparable sieve belt or hedgehog belt.

The invention claimed is:

1. A harvesting and cleaning machine defining a harvesting travel direction, and comprising:
 a cleaning apparatus for cleaning narrow root crops, the root crops having a maximum root diameter and a root length, the apparatus comprising:
  a roller device comprising:

two rotatable rollers forming a separating material inlet;
   a separating track formed by an upper side of the rotatable rollers;
   a roller gap;
   a fine material outlet located below said roller gap; and
   a coarse material outlet located at an end of the separating track opposite the separating material inlet, wherein the separating material inlet is arranged behind the coarse material outlet in the harvesting travel direction, and wherein said roller gap is large enough to allow narrow root crops to pass through to said fine material outlet and small enough to prevent coarse material with a minimum dimension greater than the maximum root diameter from passing through or being retained and transported to the coarse material outlet;
  a first conveyor arranged below said roller gap at said fine material outlet receiving all narrow root crops passing through said roller gap; and
  a second conveyor conveying separation material to the separating material inlet; and
 a harvesting device for harvesting narrow root crops, conveying the narrow root crops and soil from the ground and to deposit them as separating material onto said second conveyor.

2. A harvesting and cleaning machine according to claim 1, wherein at least one of said rotatable rollers has a cleaning and transport spiral adapted to detach impurities comprising the coarse material from the root crops and to transport the coarse material to said coarse material outlet.

3. A harvesting and cleaning machine according to claim 1, wherein said first conveyor has a conveying direction that is opposite to a conveying direction of said separating track from the separating material inlet to said coarse material outlet.

4. A harvesting and cleaning machine according to claim 1, wherein said first conveyor comprises a movable transport or sieve element adapted to separate fine material having a maximum dimension smaller than the maximum root diameter from the root crops.

5. A harvesting and cleaning machine according to claim 4, wherein the movable transport or sieve element is an element with recesses.

6. A harvesting and cleaning machine according to claim 4, wherein the moveable transport or sieve element of said first conveyor is a transport belt or a sieve belt.

7. A harvesting and cleaning machine according to claim 6, wherein the transport belt or sieve belt is a belt with recesses.

8. A harvesting and cleaning machine according to claim 6, wherein the transport belt or sieve belt of said first conveyor comprises a hedgehog belt.

9. A harvesting and cleaning machine according to claim 1, wherein a ratio of root length to maximum root diameter is greater than 2.

10. A harvesting and cleaning machine according to claim 1, wherein the root crops are selected from the group consisting of: dandelion root, parsley root, chicory root (*Cichorium intybus* var. *foliosum*), parsnip root (*Pastinaca sativa*), carrot root, and manioc root (*Manihot esculenta*).

11. A harvesting and cleaning machine according to claim 1, wherein said second conveyor comprises at least one transport belt or a sieve belt, which separates fine material having a maximum dimension smaller than the maximum root diameter of the root crops.

12. A harvesting and cleaning machine according to claim 11, wherein said at least one transport belt or sieve belt of said second conveyor is a belt with recesses.

13. A harvesting and cleaning machine according to claim 11, wherein the at least one transport belt or sieve belt of said second conveyor comprises a hedgehog belt or a square rod belt or a perforated rod belt.

14. A method of cleaning narrow root crops comprising:

providing a harvesting and cleaning machine according to claim 1;

feeding separating material, which has narrow root crops, coarse material and fine material, to the separating material inlet of the cleaning apparatus of the harvesting and cleaning machine;

guiding the separating material over the separating track of the cleaning apparatus, whereby at least coarse material and narrow root crops are separated from each other and whereby the narrow root crops pass the roller gap of the cleaning apparatus to the fine material outlet of the cleaning apparatus;

discharging the coarse material from the coarse material outlet of the cleaning apparatus; and feeding the narrow root crops or fine material from the fine material outlet to the first conveyor of the cleaning apparatus.

15. A harvesting and cleaning machine according to claim 1, wherein each of said rotatable rollers has a cleaning and transport spiral adapted to detach impurities comprising the coarse material from the root crops, and wherein the cleaning and transport spirals of said two rotatable rollers are counter-rotating.

\* \* \* \* \*